T. CARROLL.
CASH REGISTER.
APPLICATION FILED DEC. 10, 1904.
1,106,490.
Patented Aug. 11, 1914.
9 SHEETS—SHEET 4.
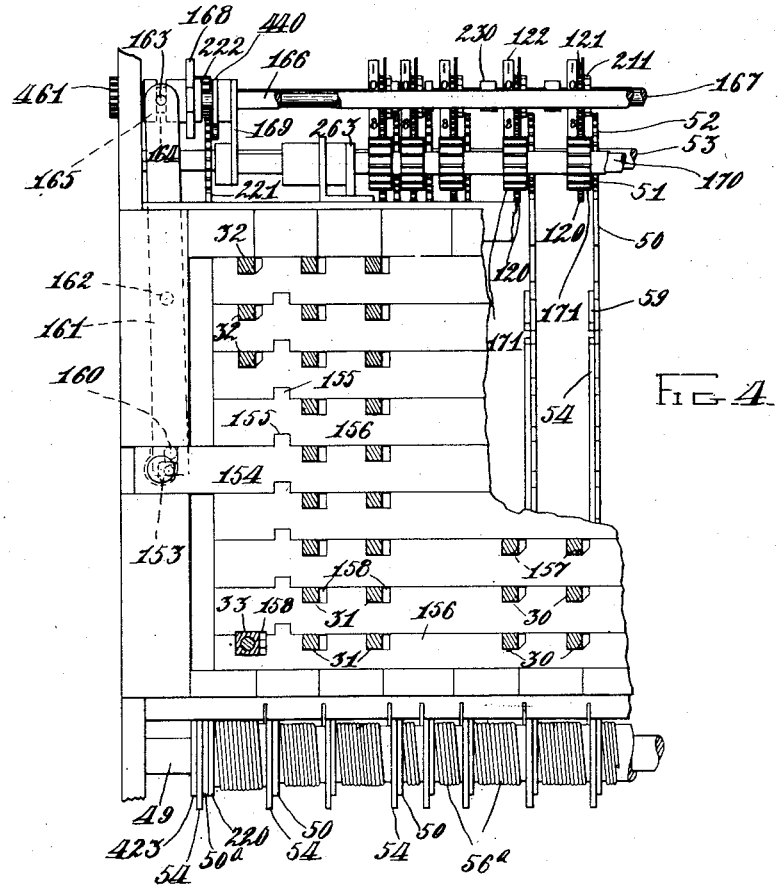
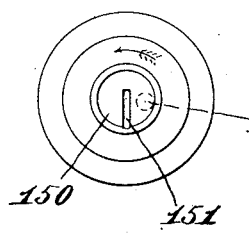
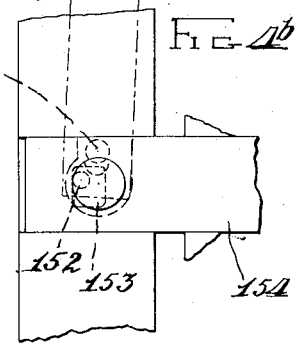

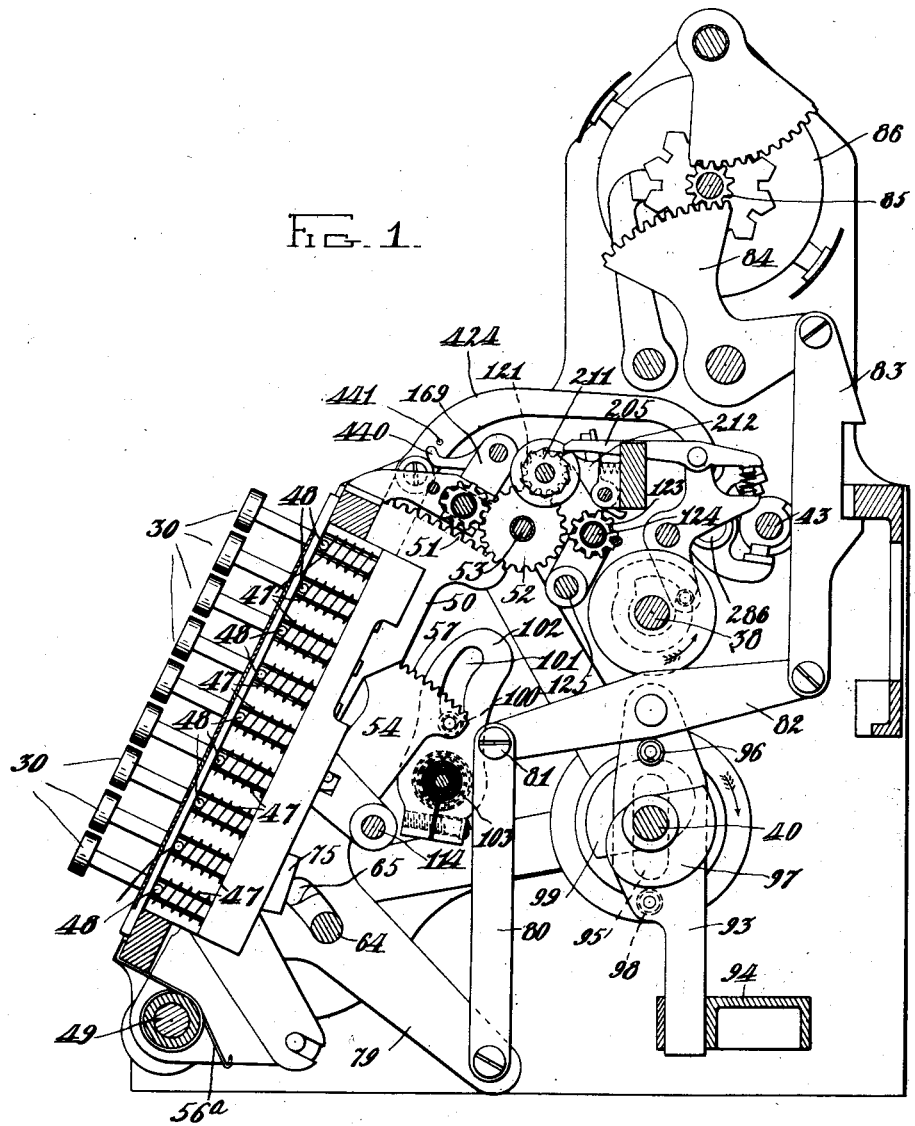

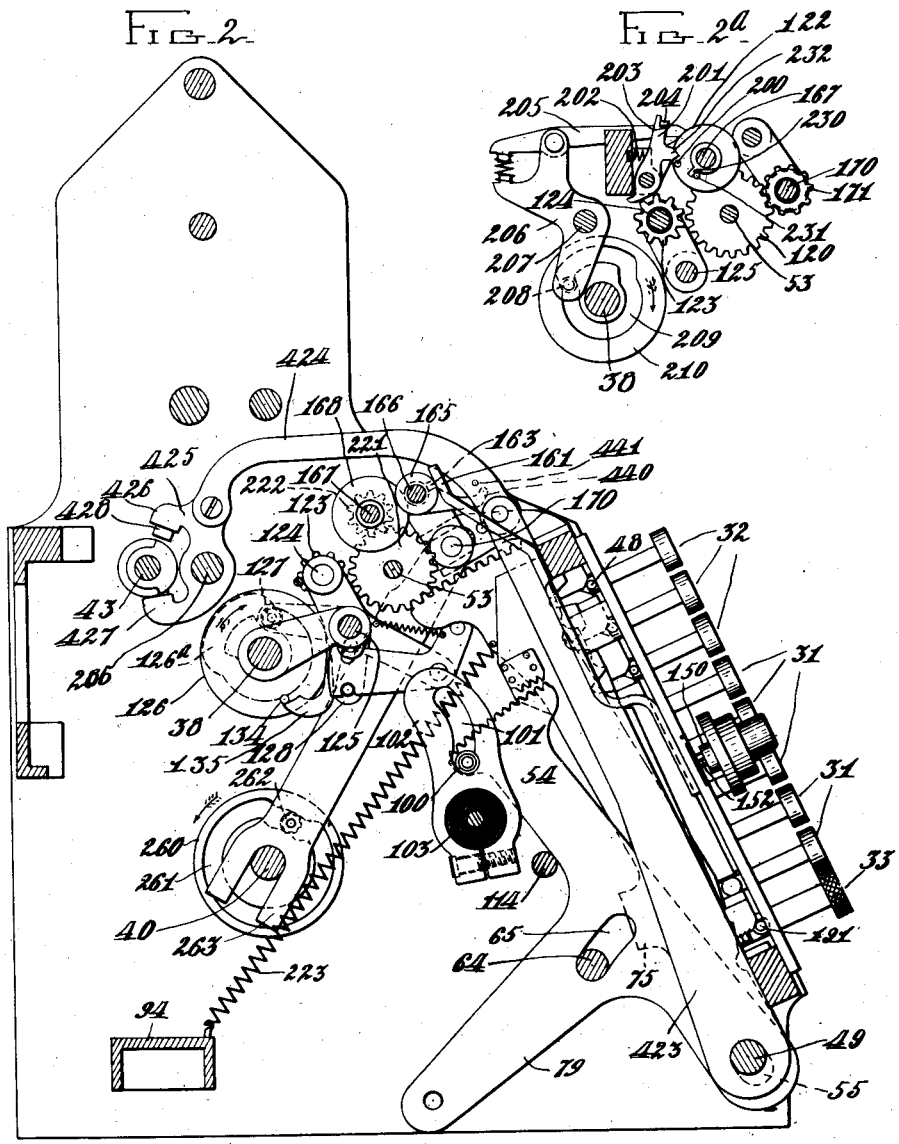

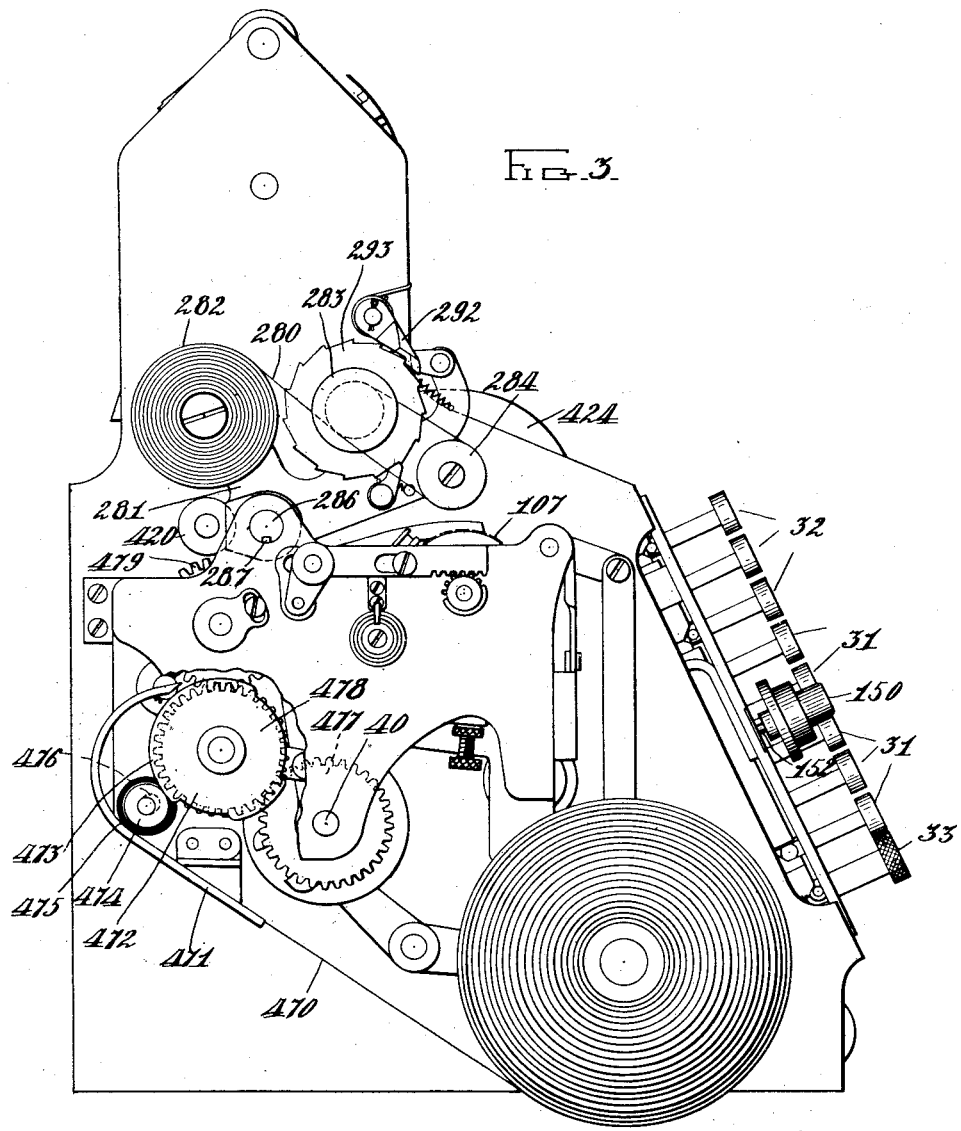

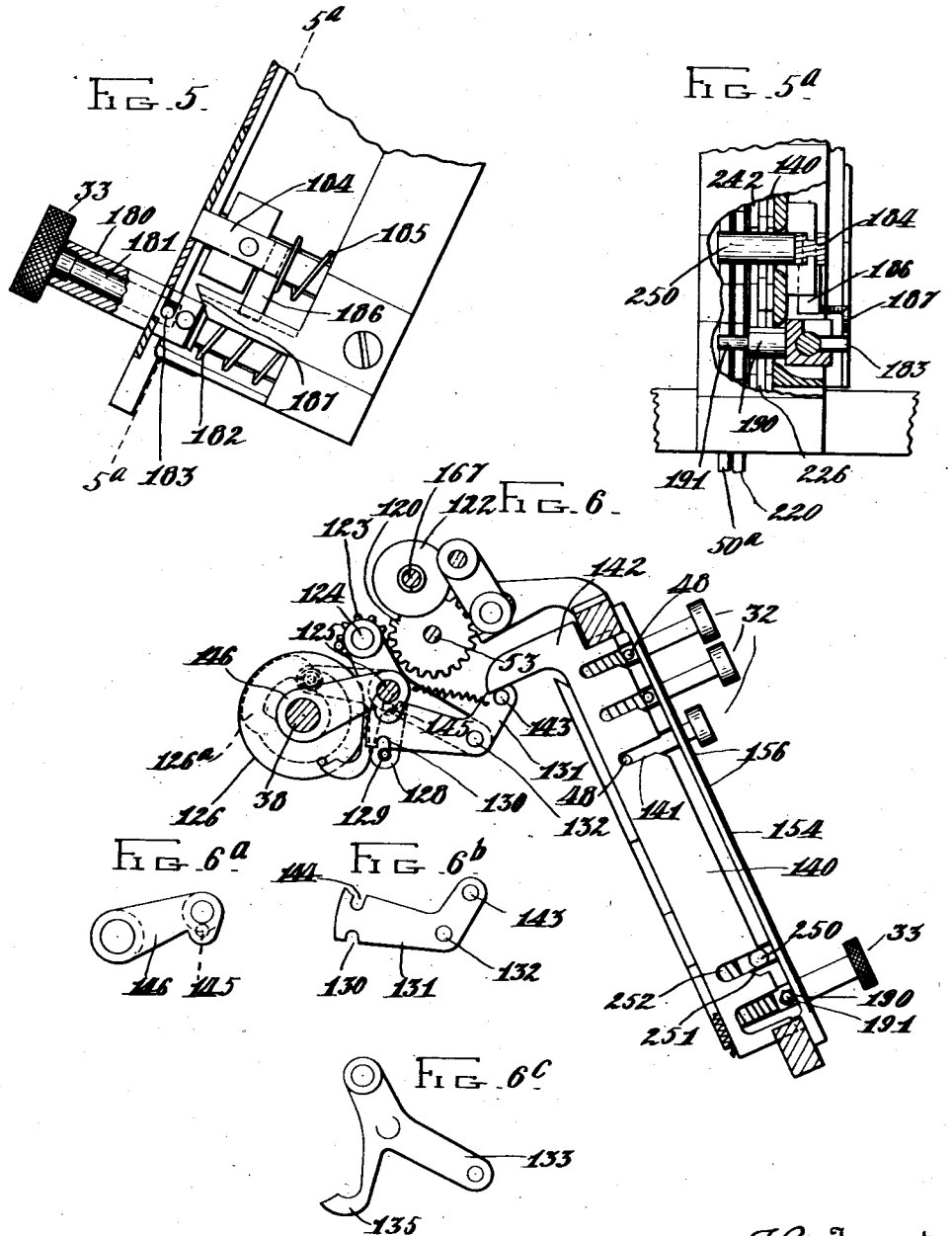

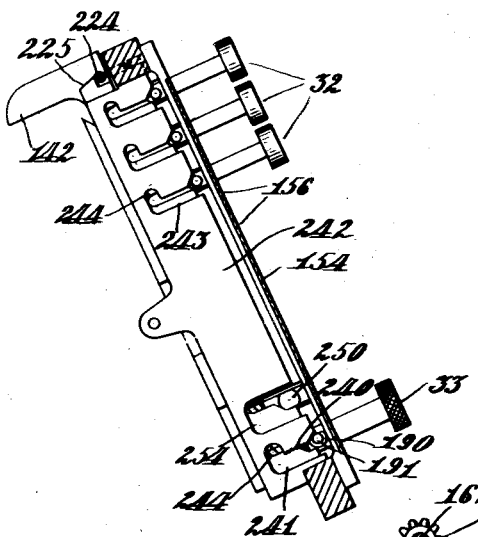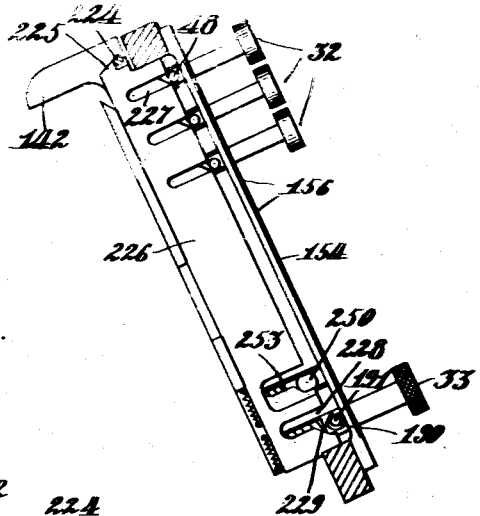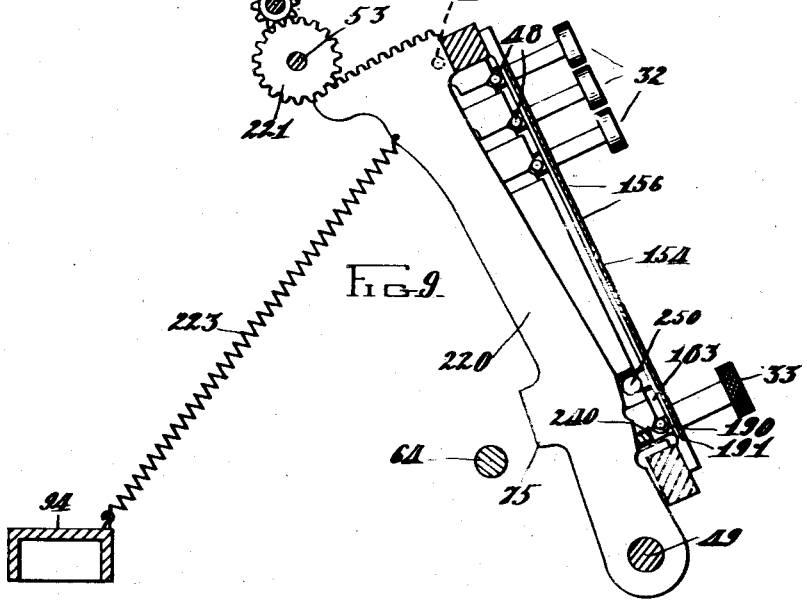

T. CARROLL.
CASH REGISTER.
APPLICATION FILED DEC. 10, 1904.
1,106,490. Patented Aug. 11, 1914.
9 SHEETS—SHEET 7.
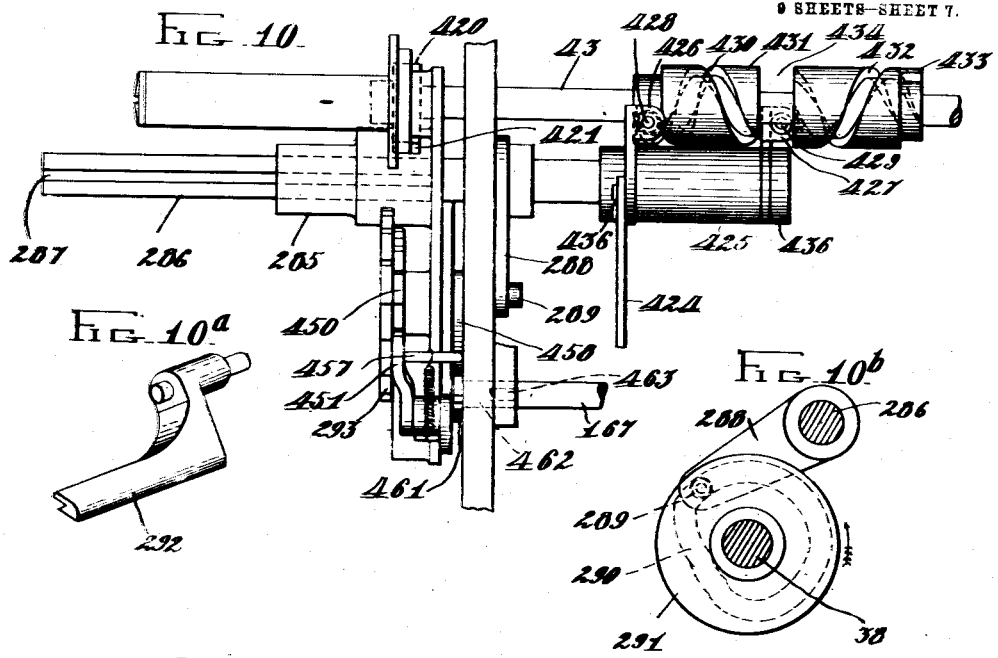
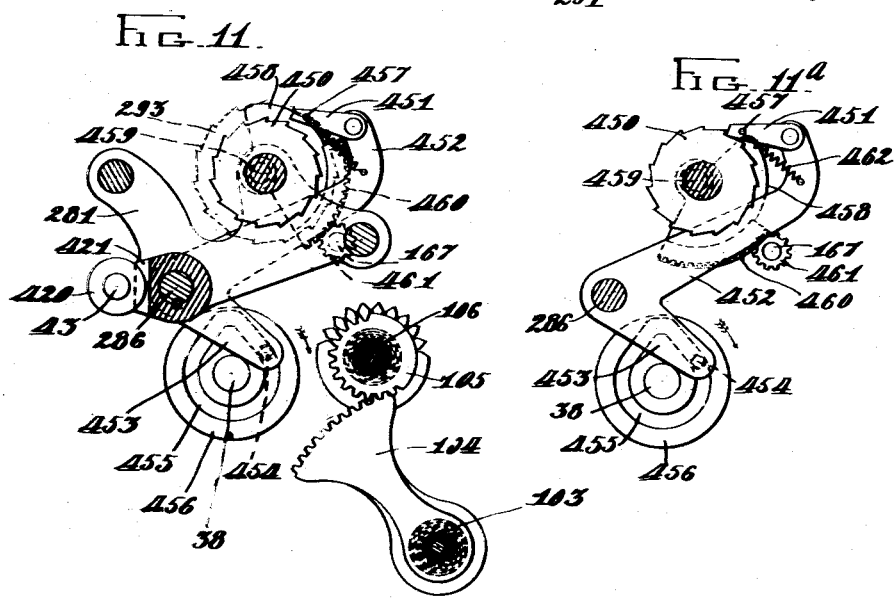
Witnesses
Wm. O. Henderson
Mildred Monfort.
Inventor
Thomas Carroll
By Frank Parker Davis
J. B. Hayward
Attorneys

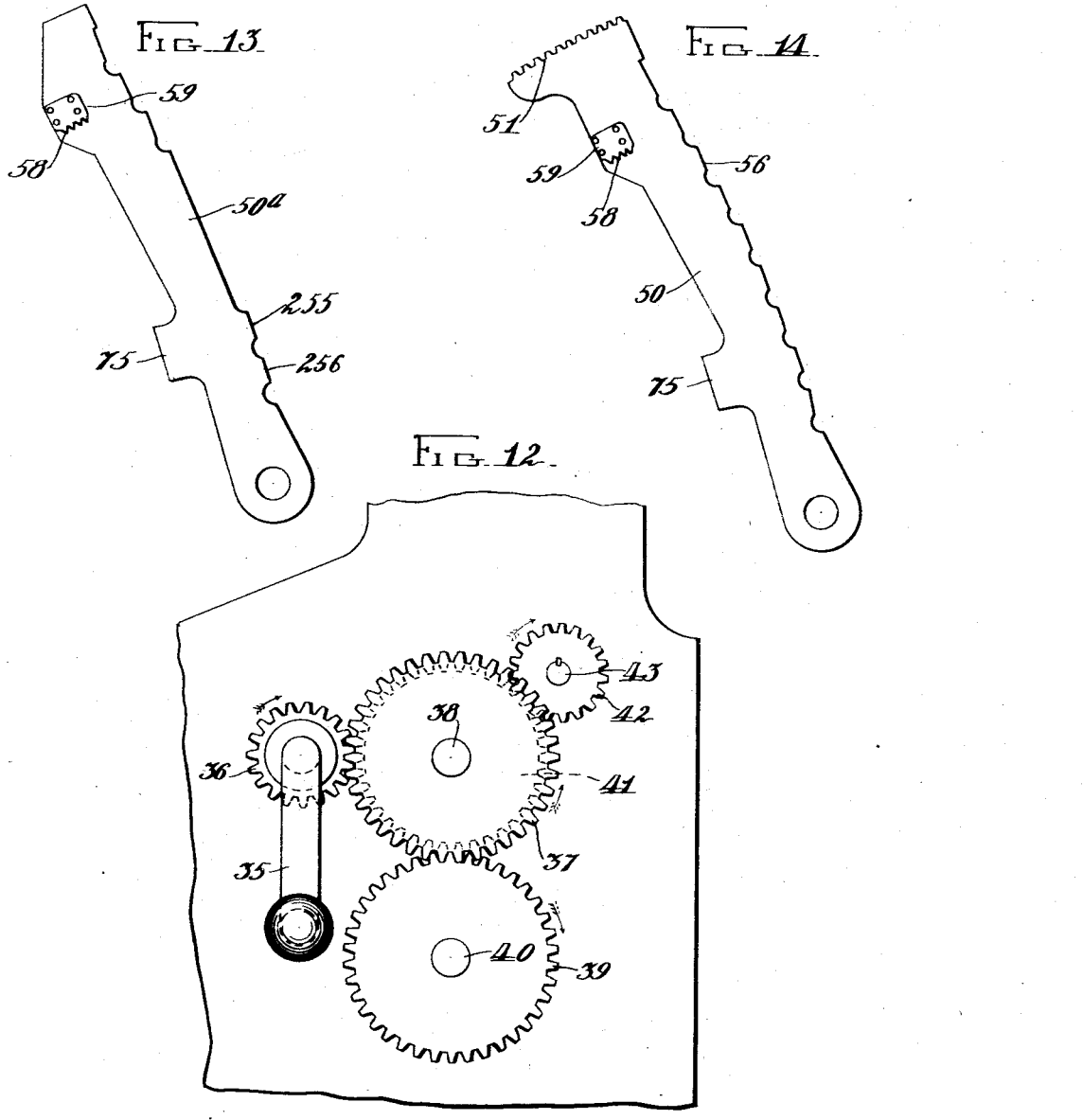

T. CARROLL.
CASH REGISTER.
APPLICATION FILED DEC. 10, 1904.
1,106,490.
Patented Aug. 11, 1914.
9 SHEETS—SHEET 9.
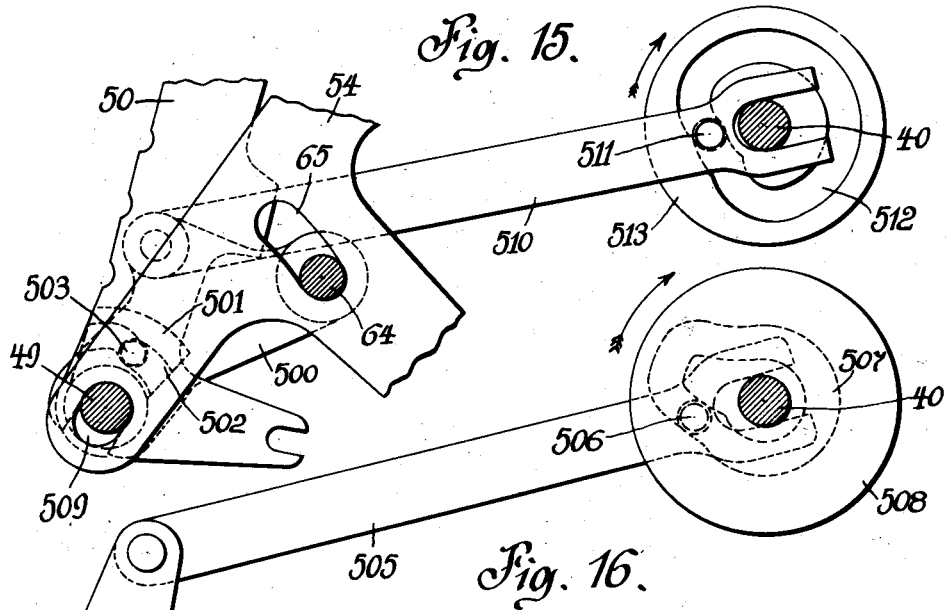
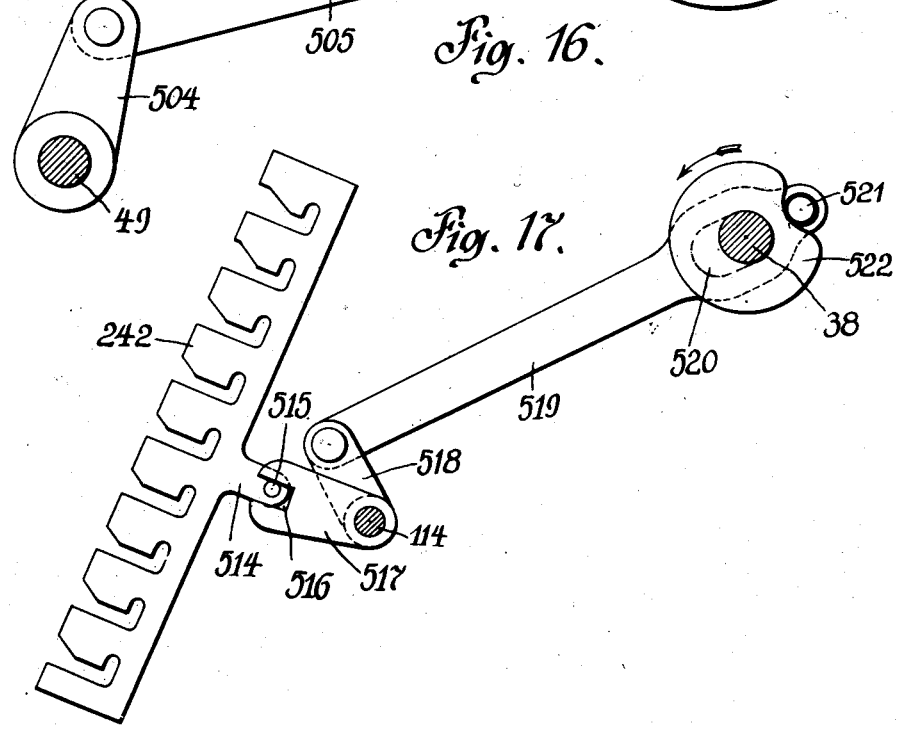
WITNESSES:
P. W. Fairchild.
Geo. S. Forderer.
INVENTOR
Thomas Carroll
BY
ATTORNEYS

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,106,490.     Specification of Letters Patent.     Patented Aug. 11, 1914.

Application filed December 10, 1904. Serial No. 236,285.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers or accounting machines and has among its objects and purposes to provide improved devices for printing the total amounts of the various transactions, these devices being so arranged as to print the total of the amounts registered up to a certain point and then reset the machine to zero automatically, or print the so called "subtotals" in which the machine is not reset to zero after the total printing but the subtotal amount remains registered in the machine in condition to have the succeeding registrations added thereto; and accompanying these features are certain locking devices and a novel paper feeding mechanism which form an advantageous accompaniment to the fulfilment of the above mentioned objects.

With these and incidental objects in view the invention consists in certain novel features of construction and combination of parts, the essential elements of which are set forth in the appended claims and a preferred form of embodiment of which is hereinafter specifically described with reference to the drawings which accompany and form part of this specification.

Of said drawings: Figure 1 represents a vertical cross section through the body of the machine to which these improvements have been applied. Fig. 2 represents a vertical section taken just inside the left hand side frame of the machine. Fig. 2$^a$ represents a detail sectional view of a part of the counter and its operating mechanism. Fig. 3 represents an end elevation of the left hand side of the machine showing the printing mechanism with the frame thereof broken away to show one of the impression rollers. Fig. 4 represents a fragmentary detail view of the keyboard of the machine, the stems of the keys being shown in section and the keyboard itself being broken away to show the operating elements. Figs. 4$^a$ and 4$^b$ represent details of certain of the locking features in connection with the keyboard. Fig. 4$^c$ represents a detail perspective view of one of the amount keys. Fig. 5 represents a detail fragmentary section of the keyboard showing in particular the total key. Fig. 5$^a$ represents a section approximately on the line 5$^a$—5$^a$ of Fig. 5, the front plates being broken away. Fig. 6 represents a detail side elevation of the mechanism involved in throwing out the counter. Fig. 6$^a$, 6$^b$ and 6$^c$ represent details of certain of the parts involved in Fig. 6. Figs. 7 and 8 represent detail sectional views of the portion of the keyboard containing three special keys and the total key, showing detents connected therewith. Fig. 9 represents a detail view of part of the mechanism used for resetting the counter to zero. Fig. 10 represents a top plan view in detail of a portion of the mechanism for carrying and for shifting the paper detail strip. Fig. 10$^a$ represents a detail perspective view of one of the feed pawls for the detail strip. Fig. 10$^b$ represents a detail view of the operating cam for rocking the detail strip carriage. Figs. 11 and 11$^a$ represent detail views of mechanism connected with the auxiliary feed of the detail strip. Fig. 12 represents a detail elevation of the gears connected with the operating crank handle. Figs. 13 and 14 represent details of certain operating elements. Fig. 15 is a detail view of the mechanism for restoring the totalizer actuators to normal position. Fig. 16 is a detail view of the mechanism for engaging the auxiliary operating segments with the totalizer actuators. Fig. 17 is a detail view of the mechanism for operating the key detents to release the operated keys.

In many of the figures certain of the parts which ordinarily should be represented have nevertheless been omitted for the sake of clearness.

For the purpose of giving an outline of the general operation of the machine, it may be stated that there is a series of amount keys, a series of clerks' numeral keys and a series of special transaction keys, which when depressed set certain parts for the necessary operation of registering, recording and indicating, the completion of the operation of the machine being effected by the revolution of the crank handle or other suitable means.

The operation of the amount keys results in the setting of certain registering bars or segments to differential positions and upon the subsequent operation of the crank handle these segments are restored to normal position, and upon such restoration to normal position the totalizer is actuated and the printing wheels are set by means of certain intermediate connections which serve to transmit the differential movement of the registering segments to the totalizer and to the printing wheels, and at the same time the indicators are set to represent the proper amounts. Means are also provided whereby the operation of any one of the special transaction keys throws the totalizer out of operation. In order to secure a printed total of the various amounts which have been registered upon the totalizer, a special total-key is provided which is adjusted into two different positions, in one of which when the key is subsequently depressed, the machine is prepared to print the total of all the amounts registered up to that point but the operation of the machine results in the so called "clearing" of the machine, that is, results in the machine being reset to zero automatically; whereas when the total key is adjusted to its other position and then depressed, the operation of the machine results in the printing of the total of all the amounts registered up to that time, but this accumulation of amounts is retained upon the totalizer, that is, in effect this total is carried forward so as to have the succeeding amounts added to it. For convenience in designation, the total in which the machine is cleared or reset to zero will be called the "final total", and the total which is printed when the machine is not cleared to zero but when the accumulation is retained upon the counter, will be designated as the "sub-total".

In order to print the various items of the special transactions in a column separate from that of the cash transactions the detail strip is mounted upon a shifting printing carriage and the operation of any one of the special keys serves to set parts such that upon the subsequent operation of the main crank handle the detail strip carriage will be shifted laterally so as to effect the printing of these items in a different column; and the feed of this detail strip is arranged so that whereas on all individual transactions the paper is spaced the same increment of distance at each operation, yet upon the printing of the totals the paper is given a double spacing movement so as easily to enable the identification of these totals on the detail strip.

The general construction of certain of the features herein set forth, such for example as the registering segments and their operating devices, the indicator mechanism, and the detail strip carriage shifting devices, is practically the same as that described in a co-pending application Serial No. 270,786, filed by Thomas Carroll on July 22, 1905.

With the above general description of the operation of the machine, the specific parts thereof will now be described more in detail.

Referring to Figs. 1, 2 and 4 it will be seen that there are three different groups of keys, the amount keys 30, the two banks of clerks' numerals keys 31 permitting the recording of clerks' numerals from 1–99, and the three special transaction keys 32, and then there is be later described. The exact arrangement of the keyboard is best shown in Fig. 4, in which figure the key stems are shown sectionalized, the ordinary heads or buttons for showing the designation of the key being shown in the other figures. A crank handle 35 (see Fig. 12) supplies the main actuating power of the machine and effects a rotation of the two main operating shafts by means of the gearing shown in said figure, the handle 35 being fast to a gear wheel 36 which meshes with a larger gear wheel 37 mounted upon the outer end of the upper operating shaft 38, and the gear 37 in turn meshes with a companion gear wheel 39 fast upon the outer end of the lower operating shaft 40, these two shafts 38 and 40 being provided with the various operating cams and devices for actuating the different parts of the machine. Fast upon the shaft 38 is another gear wheel 41 which meshes with a smaller gear wheel 42 which is splined upon the right hand end of an auxiliary operating shaft 43 which effects the shifting of the printer carriage in the manner to be described.

*Operating elements.*—The operation of the operating elements by the keys will now be described. The keys are provided with springs 47 which normally hold the keys in outward position by pressing against stop pins 48. Extending across the lower portion of the machine is a transverse shaft 49 upon which are pivoted the various register operating segments 50, the exact contour of which segments is shown in detail in Fig. 14. The upper ends of these segments are formed with teeth 51 which mesh with pinions 52 (see Fig. 1) mounted loosely upon the transverse shaft 53, and by means of certain idle pinions later to be described, these pinions 52 are arranged to be coupled to the totalizer wheels so as to transmit to the totalizer the various differential movements of the register operating segments 50. There is one of these operating segments 50 for each of the banks of amount keys as shown in Figs. 1 and 4, but for the bank of clerks' numerals keys the teeth on the end of their operating elements are omitted since these elements do not operate totalizer wheels but simply serve to set printer wheels in a manner to be described; and for the bank containing the three special transaction keys together with the totalizing key there is a special operating element 50ª the shape of which is shown in detail in Fig. 13, this special operating element not having any teeth corresponding to the teeth 51 of the totalizer operating element and being utilized merely to set the printer wheels in the manner to be described. Coöperating with each of the aforesaid operating elements 50 and 50ª is an indicator and printer setting segment 54 (see Figs. 1 and 2) which is pivoted upon the transverse shaft 49 but at its pivotal point is formed with a slot 55 as shown in Fig. 2 to permit the raising of these auxiliary setting segments for a purpose to be presently described. The forward sides of the various operating elements 50 and 50ª are formed with steps 56 (see Fig. 14) which are engaged by the pins 48 of the various keys so that upon the pressing in of any key the corresponding operating element 50 will be rocked to a greater or less extent according to the value of the key depressed, the uppermost key of any bank giving the least extent of movement to the operative element, and the lowermost key giving the greatest extent of movement, these differential movements being such as to effect the necessary gradations of value from 1–9, or in the case of the special transaction and totalizing keys to give the necessary gradations of movement to permit the setting of the printing and indicating wheels to different positions. All of the operating elements are normally spring-pressed into their forward positions by means of springs 56ª (see Figs. 1 and 4) surrounding collars mounted on the transverse shaft 49 and engaging the lower and rearwardly projecting ends of the operating elements 50 and 50ª. On the upper end of each of the auxiliary operating segments 54 are formed teeth 57 which are arranged to engage teeth 58 (see Figs. 13 and 14) formed on a block 59 fast upon the side of each one of the operating elements 50 and 50ª. In order to raise the auxiliary operating segments 54 into mesh with the aforesaid teeth 58, there is provided a transversely extending restoring bar 64 (see Figs. 1, 2 and 15) which extends through slots 65 formed in the segments 54. This bar 64 forms a transverse connecting bar for two side plates 500 of a restoring frame which is pivoted upon the shaft 49, and the entire restoring frame including the bar 64 is lifted and rocked forward at each operation of the machine by means of the following mechanism operated from the lower operating shaft 40. Adjacent to each of the side plates 500 is a plate 501 which is secured to the rock shaft 49. These plates are provided with cam grooves 502 into which project pins 503 extending from the side plates 500. Secured to the rock shaft 49 and extending upwardly therefrom is an arm 504 (see Fig. 16), the upper end of which is connected to the forward end of a link 505, the rearward end of which is forked so as to straddle the shaft 40 and near the rear end of the link 505 is an anti-friction roller 506 which projects into a cam groove 507 formed in a disk 508 secured to the shaft 40. The shape of the groove 507 is such that at the beginning of the operation of the machine it will draw the link 505 rearwardly and thereby rock the shaft 49 clockwise, by which movement the frame comprising the plates 500 and the transverse rod 64 will be elevated by the cam plates 501 which engage with the rollers 503. This elevation of the rod 64 will carry the auxiliary operating segments 54 upwardly so that the teeth 57 formed thereon will engage with the teeth 58 formed upon the blocks 59 secured to the main operating elements 50 and 50ª, this elevation of the auxiliary operating elements being permitted by slots 509 formed in the lower end of said segments and through which the shaft 49 extends, while the lower end of the side plates 500 are cut away so as to permit the elevation of the frame of which the side plates 500 are a part. Immediately after the engagement of the segments 54 with the operating elements 50 and 50ª, the frame comprising the side arms 500 and the rod 64 is rocked counter clockwise about the shaft 49 by a link 510, the forward end of which is secured to one of the plates 500, while the rearward end is forked so as to straddle the shaft 40. An anti-friction roller 511 projects from the rear end of link 510 into a cam groove 512 formed in a disk 513 secured to the shaft 40.

The lower and rearward portion of each of the operating elements 50 and 50ª is formed with a projection 75 which lies in the path of the restoring bar 64. In the operation of these various parts, the desired keys are first pressed in whereupon the operating elements 50 and 50ª are set differentially, and then upon the operation of the machine the restoring bar 64 is first lifted so as to carry all of the auxiliary segments 54 into mesh with the teeth 58 of their respective operating elements 50 and 50ª so as to lock these two sets of elements together, and then the restoring bar is moved forward and striking the projection 75 restores all of the operating elements 50 and 50ª to normal forward position, thereby giving them differential movements of restoration corresponding to the amount of their initial displacements, and since the auxiliary segments 54 are during this period locked to the elements 50 and 50ª these auxiliary segments are also given corresponding degrees of differential movement for the purpose of setting the printing wheels and the indicator wheels, in a manner to be described.

The lower and rearward portion of each of the operating elements 50 and 50ª is formed with a projection 75 which lies in the path of the restoring bar 64. In the operation of these various parts, the desired keys are first pressed in whereupon the operating elements 50 and 50ª are set differentially, and then upon the operation of the machine the restoring bar 64 is first lifted so as to carry all of the auxiliary segments 54 into mesh with the teeth 58 of their respective operating elements 50 and 50ª so as to lock these sets of elements together, and then the restoring bar is moved forward and striking the projection 75 restores all of the operating elements 50 and 50ª to normal forward position, thereby giving them differential movements of restoration corresponding to the amount of their initial displacements, and since the auxiliary segments 54 are during this period locked to the elements 50 and 50ª these auxiliary segments are also given corresponding degrees of differential movement for the purpose of setting the printing wheels and the indicator wheels, in a manner to be described.

The depressed keys are released at the beginning of the operation of the machine by the mechanism shown in Fig. 17 which is operated as follows: All of the key bands have detents similar to the detent 242 which coöperates with the special keys, as shown in Fig. 8, with the exception that none of the slots of the remaining detents are provided with full stroke devices 240. Each of these detents has extending rearwardly therefrom a projection 514 which is provided with a pin 515 that plays in the slot 516 formed in the forward end of an arm 517 secured to the shaft 114. Secured to the shaft 114 and extending upwardly therefrom is an arm 518 which is connected at its upper end to the forward end of a link 519, the rearward end of the latter being provided with an elongated slot 520 through which extends an operating shaft 38. The extreme rearward end of the link 519 is provided with an anti-friction roller 521 with which a cam disk 522 is arranged to engage at the very beginning of the operation of the machine and move the link 519 rearwardly, which movement will rock the shaft 114 clockwise and by the lower walls of the slots 516 formed in the arms 517 engaging with the pins 515 will elevate the detents 242 and thereby release the depressed keys. After the printing wheels have been set in this manner the printing is effected and then upon the continued movement of the operating mechanism the restoring bar 64 is dropped to normal position thereby freeing the segments 54 from the operating elements 50 and 50ª and the bar 64 is then restored to normal rearward position thus carrying the segments 54 also back to normal rearward position.

The mechanism for setting the indicators according to the keys operated comprises an arm 79 (see Fig. 1) extending rearwardly from each segment 54 to which arm is connected a link 80 which is pivoted at 81 to a power application bar 82 which at its rearward end is pivoted to another link 83 attached to the rearward end of a bell crank formed indicator setting segment 84 which segment meshes with a pinion 85 fast on the side of the indicator 86. To the middle portion of each bar 82 is pivoted a downwardly extending bar 93 which extends into slots formed in a cross bar 94. These bars 93 are formed with slots 95 and surround the lower operating shaft 40 and by means of cams 97 and 99 acting upon antifriction rollers 96 and 98, said cams being mounted rigidly upon the shaft 40, the indicators are set at each operation of the machine to the proper positions corresponding to the keys depressed, this setting of the indicators being effected through the power application bar 82. This indicator setting mechanism forms the subject matter of claims in the said co-pending application and will not be described more in detail here.

In order to set the type wheels to positions corresponding to the keys depressed, each of the segments 54 (see Fig. 1), is provided with an antifriction roller 100 which projects into a curved slot 101 formed in an arm 102 fast upon the end of a suitable collar arranged to transmit movement to the printing wheels. This series of nested collars or sleeves 103 extend through to the left hand side of the machine being also shown in Figs. 2 and 11. As shown in Fig. 11, these sleeves 103 are made fast to corresponding segments 104 which mesh with pinions 105 fast upon the ends of a second series of nested sleeves 106 to which sleeves the printing wheels 107 (see Fig. 3) are made fast, these printing wheels being provided with duplicate type on their periphery for the purpose of printing both a detail strip and a check. The detailed construction for printing both the detail strip and check is set forth in said co-pending application and only so much of the same will be described herein as to point out the novel features claimed in the present application.

It will be seen that the setting of the printing wheels takes place upon the previously described restoring of the operating segments to normal position, during which time the segments 54 are coupled thereto and consequently the differential movements of the segments 54 act through the curved arms 102 to set the printer wheels to corresponding degrees. The backward movement of the segments 54 is in each case limited by the transverse shaft 114, (see Figs. 1 and 2).

*Totalizing mechanism.*—In order to transmit the differential movements of the operating elements 50 to the totalizer or registering wheels, the following mechanism is provided. Side by side with each of the previously described pinions 52 (see Fig. 4), and also turning loosely upon the shaft 53 are totalizer operating pinions 120, which pinions engage with corresponding pinions 121 mounted on the side of the totalizing wheels 122. The registering segments 50 normally operate the pinions 52 during the setting movements of the segments 50 but of course do not have any effect upon the totalizer operating pinions 120. However, a set of idle pinions 123 (see Figs. 1 and 2) is provided for coupling together the two sets of pinions 52 and 120, these idle pinions being mounted upon a rod 124, which rod is carried upon arms extending upward from a rock shaft 125. This shaft is normally rocked at each operation of the machine to carry the idle pinions into engagement with their corresponding pairs of pinions, the mechanism for effecting this being shown in Figs. 2 and 6. Fast upon the upper operating shaft 38 is an operating disk 126 formed with a cam groove 126ª into which projects a roller 127 fast upon the rearwardly extending arm of a bell crank lever 128. The lower end of the other arm of this bell crank lever has upon it a pin 129 (see Fig. 6) arranged to be engaged by a slot 130 formed in the lower side of the rearward arm of another bell crank lever 131 which is pivoted at 132 to the forwardly and downwardly extending arm 133 of a three-pronged piece in the upper arm of which is mounted the aforesaid rod 124 carrying the idle pinions 123, the shape of this three-pronged piece being shown in detail in Fig. 6ᶜ, and the shape of the bell crank lever 131 being shown in Fig. 6ᵇ. In Fig. 2 the notch 130 is shown engaging the pin 129, and in such position it will be seen that upon the revolution of the upper operating shaft 38 in the direction shown by the arrow, the shape of the cam groove 126ª is such that the bell crank lever 128 will have its downward arm rocked rearward thereby pulling rearward the arm 133 of the aforesaid three-pronged device and thus the upper arm of the latter will be rocked forward to carry the various idle pinions into engagement with their respective pairs of pinions; and at the completion of the revolution of the shaft 38 the pin 134 (Fig. 2) mounted on the side of the disk 126 strikes the rearwardly extending arm 135 of the aforesaid three-pronged device and positively forces the idle pinions 123 out of engagement with their respective pinions. A spring 131ª normally forces the notch 130 of the bell crank 131 into engagement with the pin 129. As this mechanism involves the consideration of mechanism for throwing the totalizer out of operation when any one of the special transaction keys is depressed, this latter mechanism will now be described.

Coöperating with the bank of special keys 32 and total key 33 is a detent plate 140 (see Fig. 6) in the upper end of which slots 141 are formed, the lower edges of these slots being formed with beveled portions so that when any one of the keys 32 is pressed inward its pin 48 will act upon the beveled portion and then pass down into the slot and in so doing will force the detent plate 140 downward, and the upper end of the plate is formed with a rearward extending arm 142 which stands over a pin 143 formed on the forward end of the bell crank lever 131, and when any special key is pressed inward as shown in Fig. 6, the arm 142 acting upon the pin 143 rocks the bell crank lever 131 upward so as to withdraw the slot 130 from engagement with the pin 129; and this movement is sufficient to carry another slot 144 (see Fig. 6ᵇ) formed in said bell crank lever 131 on the opposite side from the slot 130, into engagement with a pin 145 fast upon a stationary arm 146 (see Fig. 6ª) extending from the shaft 38 to the shaft 125. In this position it will be seen that the operation of the cam disk 126, although having a rocking effect on the lower end of the bell crank lever 128, yet has no effect to rock forward the idle pinions 123 in the ordinary manner, since the slot 130 is no longer in engagement with the pin 129, and moreover during such period the shaft 125 and the idle pinions 123 are held secure from rocking movement because of the engagement of the slot 144 with the pin 145. It will be observed that in this manner the totalizer is thrown out of operation upon the depression of any one of the special keys, since the failure to rock in the idle or coupling pinions 123 prevents the movement of the gear wheels 52 from being transmitted to the totalizer operating gear wheels 120. This same throwout mechanism is utilized in connection with the printing of the totals upon the operation of the totalizing key 33 in a manner which will be set forth hereinafter.

*Transfer mechanism.*—The transfer mechanism is best shown in Figs. 1 and 2ª. Mounted upon each totalizing wheel is a transfer tripping pin 200 which upon the turning of the wheel from nine to zero trips a tripping pawl 201 against the tension of its spring 202 and thereby withdraws a shoulder 203 of said tripping pawl from under a lug 204 which projects laterally from a transfer pawl 205 of the wheel of the next higher order, which transfer pawl is pivoted at the upper end of a transfer lever 206 pivoted upon a transverse rod 207 and carrying at its lower end a roller 208 projecting into a cam groove 209 formed in a disk 210 fast upon the upper operating shaft 38. There is a series of these transfer pawls and operating disks for each one of the totalizing wheels above the units wheel, and these pawls are normally held in the position shown in Fig. 2ª with their lugs 205 resting upon the shoulders 203 of the tripping pawls 201, in such manner that the forward ends of the transfer pawls are held free from the transfer ratchet wheels 211 (see Fig. 1) which are fast upon the sides of the totalizing wheels; but when the tripping pawl is tripped in the manner above mentioned, the transfer pawl drops into engagement with the ratchet wheel 211 and upon the operation of the shaft 38 in the direction shown by the arrows, the transfer pawls are all forced forward and those which have been allowed to drop down into engagement with their respective ratchet wheels transmit a unitary transfer movement to the totalizer wheels. In the normal raised positions of the transfer pawls 205, the pawls are free from the totalizing wheels and the wheels can therefore be reset to zero without the necessity of rocking the transfer pawls out of engagement therewith, this resetting to zero being part of the process of printing totals as will be later described. Retaining pawls 212 (see Fig. 1) hold the registering wheels in proper position, but permit the turning of the wheels in either direction.

*Total printing.*—In the process of printing the so-called final totals and sub totals it may be stated that the totalizing key is arranged to be rotated or adjusted into one or the other of two different positions, in one of which positions when depressed the key prepares the parts for printing a final total upon the operation of the machine, that is, where the totalizer is automatically reset to zero, and in the other of which positions when the key is depressed the sub-total is printed, the accumulated amount being retained upon the totalizer; but prior to the operation of this totalizing key it is necessary to operate a manipulative device consisting in the present instance of an ordinary key lock, the barrel of which lock when rotated by its key effects the unlocking of the totalizing key and locks all of the amount keys and the special transaction keys and also sets the necessary devices for coöperating to print the desired totals. This manipulative device just referred to is shown in Figs. 4, 4ª and 4ᵇ. The barrel 150 of the lock (see Fig. 4ª) has formed in it the usual slot 151 into which an ordinary form of key is inserted, and when the key is rotated the rotation of the barrel carries with it a stud 152 fast thereon, which stud plays in a recess 153 formed in a transverse locking plate 154. In Fig. 4 the normal position of the lock barrel and said locking plate is shown, whereas in Fig. 4ᵇ the position of the parts is shown when the lock barrel has been rotated by the key to carry the stud 152 through an angle of 180 degrees whereupon the stud acts upon the walls of the recess 153 and throws the locking plate 154 to the left, this displaced position being shown in Fig. 4ᵇ. This locking plate 154 extends across the entire keyboard of the machine and is formed with recesses through which the various keys may pass, and on the upper side of the plate is an offset 155 which projects into a recess of the same shape formed in a similar locking plate 156. There is a similar locking plate 156 for each of the rows of keys across the machine and it will be seen plainly from Fig. 4 that these plates are all connected to move in unison by the series of offsets 155 whereby all of the plates are locked together. As shown in Fig. 4ᶜ the shanks of the keys are formed with notches 157 cut diagonally across between two adjacent surfaces of the square key shank, the outline of this notch being shown in dotted lines upon the sections of the keys in Fig. 4. The bank of clerk's numeral keys are however not formed with any such notches, as will be observed in Fig. 4, whereas all of the amount keys and the three special transaction keys have such notches, and the totalizing key 33 has such a notch upon its lower left hand corner. The plates 154 and 156 are all of such thickness as to slide in said notches and the recesses through which the keys pass are, as regards the three special transaction keys and amount keys, of such shape as shown in Fig. 4, permitting the depressing of any amount key or the special transaction keys when the plates are all in their normal position shifted to the right; but when the plate 154 is shifted to the left in the position shown in Fig. 4ᵇ as just described, and all of the other plates 156 are likewise shifted to the left by reason of the offsets 155, the plates are then drawn so that their edges now engage with the diagonal notches 157 of all of the amount keys and the three special transaction keys and thereby securely lock all of said keys from depression. Upon such movement to the left, however, of the lowermost plate 156, it will be obvious that this movement is sufficient to withdraw the edge of the plate from engagement with the diagonal notch formed in the lower left hand corner of the totalizing key 33, thereby unlocking said key, the key being normally locked when the plate stands in its extreme right-hand position. This shifting of the lower plate 156 to the left of course requires that the recess through which the totalizing key passes should be sufficient to permit this movement, that is, through the medium of a small space such as 158 between the right-hand side of the key and the edge of the plate so as to permit the necessary shifting of the plate to withdraw the latter from the diagonal notch; and likewise it will be observed that there are similar spaces 158 to the right of all the clerks' numeral keys 31 and this permits the shifting of the plates as far as the clerks' numeral keys are concerned and since there are no diagonal notches for these keys the keys still remain operative, the recess through which their shanks pass being simply larger longitudinally to allow for the necessary play of the plates, and thus the clerks' numeral keys are always unlocked so that they may be operated either for ordinary transactions or for the printing of the totals.

It will be seen that the operation of the manipulative device or key barrel 150 serves to control the operativeness of the amount and special transaction keys and the special totalizing key, and when the parts are in normal position shown in Fig. 4 all of the keys are operative except the totalizing key which is locked, and when the key barrel 150 is adjusted to the position shown in Fig. 4ᵇ, all of the special transaction and the amount keys are locked, while the totalizing key is unlocked. This same shifting of the plate 154 by means of the key barrel 150 also serves to adjust certain other parts as will now be described. Straddling a pin 160 formed on the plate 154 is a lever 161 pivoted at 162 and carrying at its upper end a pin 163 which projects into a groove 164 formed in a collar 165 mounted upon a laterally shifting shaft 166. To the rear of this shaft 166 is another slightly larger shaft 167 (see Fig. 2) upon which the aforesaid totalizing wheels 122 are mounted. In Fig. 4 this shaft 166 is shown broken away so as to reveal the rear shaft 167 carrying the counter wheels. Fast upon the rear shaft 167 is a disk 168 which projects into a second groove formed in the aforesaid collar 165, so that when said collar is shifted laterally the disk 168 and its shaft 167 will likewise be shifted to the right. Extending downward from the shaft 166 are arms 169 (see Figs. 1, 2 and 4) the lower ends of these arms having mounted therein a transverse rod 170 which stands in front of the aforesaid shaft 53 (see Fig. 4). This shaft 170 carries a second series of coupling pinions 171, which front line of pinions are shifted laterally to the right (see Fig. 4) when the shaft 166 is shifted to the right. It will be plain that this shifting movement takes place when the plate 154 is shifted to the left in the manner previously described, in which case the movement of the lower end of the lever 161 to the left rocks the upper end thereof to the right and thereupon carries the collar 165, shaft 166, shaft 167 and shaft 170 all to the right, thus carrying the front line of pinions 171 to the right far enough to cause said pinions to engage both the gears 52 and the totalizer operating gears 120, these pinions 171 being sufficiently wide for this purpose. When the parts are in this position it will be seen that the totalizer wheels are in effect coupled up to the operating elements 50 through the means of the front line of idle pinions 171, and this is the position which they assume for the purpose of totalization in the manner to be now described.

The totalizing key itself will next be described. This key comprises an outer tube 180 (see Fig. 5) which tube is square in cross-section and contains within it the round shank 181 to the outer end of which is made fast the knurled knob of the key 33. The square tube 180 is arranged to be depressed against the tension of a spring 182, but the knurled knob carrying the shank 181 may be rotated through an angle of 90 degrees so that a pin 183 formed on the inner end of said shank may assume either a vertical or a horizontal position. Just above this total key is a false key having a shank 184 spring pressed outward by means of a spring 185 and provided with a downwardly projecting lug 186 which the pin 183 is arranged to strike against when the key 33 is rotated so as to cause the pin 183 to assume the vertical position, and thus it will be noticed that when the key is in such position, as shown in Fig. 9, the depression of the totalizing key 33 will carry inward both the tube 180 and the shank 181, and consequently the pin 183 striking the lug 186 also depresses the false key 184. A stationary V-shaped and double beveled projection 187 (see Figs. 5 and 5ᵃ) causes the shank 181 to be positively rotated either to the horizontal or to the vertical position upon the depression of a key, according as the pin 183 strikes either the upper or the lower side of said projection 187, so that the shank 181 cannot assume an intermediate position but is compelled to be either in vertical or in horizontal position. Extending from the left-hand side of the tube 180 is a pin 190 (see Fig. 5ᵃ) which extends far enough to project over three detent plates, the right-hand one of which is the detent plate 140 which has previously been described and the purpose of the other two of which will be described later, and projecting still further to the left from the pin 190 is a smaller pin 191 which projects over two other plates, one of which is the stepped operating element 50ᵃ (shown in Fig. 13 and previously described), and the other of which is a turn-to-zero segment which is presently to be described.

Referring to Fig. 9 it will be seen that there is pivoted to the transverse shaft 49 the segment 220 the teeth on the upper end of which mesh with the gear wheel 221 which turns loosely upon the aforesaid shaft 53 and meshes with the pinion 222 fast upon the aforesaid shaft 167 which carries the various registering wheels. This segment 220 is normally spring drawn rearward by means of a spring 223, and the rearward movement is limited by the shoulder 75 striking against the previously described transverse restoring shaft 64. This segment 220 as shown in Fig. 5ª is adjacent to and to the right of the aforesaid operating element 50ª which is used for setting the type wheels for the special transaction and totalizing keys. Projecting from the right hand side of the segment 220 and at the upper end thereof is a pin 224, (Fig. 9) which extends laterally to be engaged by the nose 225 (Fig. 7) of a detent plate 226, which plate as shown in Fig. 5ª is the second plate from the right being adjacent to the previously described plate 140. The upper end of this plate is formed with notches 227 into which the pins 48 of the special keys 32 may operate without affecting the plate, and at the lower end the plate is formed with a notch 228 having a beveled surface 229 which is arranged to be struck by the aforesaid pin 190 which projects from the shank of the totalizing key, so that when the totalizing key is depressed the pin 190 will strike the bevel surface 229 and pull the detent plate 226 downward against spring tension and thereby withdraw the nose 225 from engagement with the pin 224 and permit the spring 223 to pull the segment 220 rearward until its shoulder 75 strikes the restoring bar 64. If the spring should fail to work the pin 191 will strike the forward edge of the segment 220 and positively force the segment rearward. The purpose of this rearward movement of the segment 220 is to reset the totalizer wheels to zero for the purpose of printing the totals, and this zero setting mechanism will now be described. The totalizer shaft 167 carrying the various wheels 122 is formed with a series of collars having lugs 230 projecting therefrom (see Figs. 2ª and 4.). These lugs 230 are arranged to coöperate with pins 231 fast upon the various registering wheels, but the lugs 230 are normally out of alinement with said pins and are only brought into alinement upon the shifting of said shaft in the manner previously set forth. It will be remembered that this shifting takes place by the adjustment of the manipulative device or key barrel 150 preparatory to the operation of the totalizing key, and when such shifting has taken place and the lugs 230 are brought into lateral alinement with the pins 231, the totalizing key when then depressed will cause the retraction of the segment 220 in the manner explained, and therefore will cause the rotation of the shaft 167 by means of the pinions 221 and 222, and the arrangement of the parts is such that the shaft 167 will be given almost a complete reverse rotation so as to pick up all of the totalizing wheels and turn them reversely to zero, thereby of course giving them the same extent of rotation individually as had been previously registered upon them, this method of returning to zero being well known in the art. The position of the totalizing wheels shown in Fig. 2ª is that of the nine position, the transfer pin 200 being just ready to trip the transfer tripping pawl 201 on the continued movement of the totalizer wheel, and if the totalizer is now reset to zero in the manner described, the rotation of the shaft 167 in the direction reversely to that of the movement of registration of the totalizer wheels, will rotate each totalizer wheel so as to bring the tripping pins 200 to a position on the upper side of the forward extending noses 232 of the tripping pawls 201, and the action of the pins against these noses is such as to act directly toward the pivotal center of the tripping pawls, so that the latter cannot be rocked backward by the pressure of the pins 200 against them, and in this manner the tripping pawls act as a positive stop for the resetting movement of the totalizer wheels, the counter wheels being in zero position when the pins 200 are brought against the upper side of the projecting noses 232 of the tripping pawls 201. Thus it will be seen that there is never any tripping of the transfer tripping pawls upon the operation of the resetting to zero of the totalizer. The connections for setting up the printing wheels for printing totals upon this resetting of the counter to zero will be described later, but first the description of the totalizing key and its connecting mechanism will be completed. The aforesaid pin 190 (see Fig. 5ª) projecting from the side of the key shank or tube 180 of the totalizing key is so flattened on one side as shown in Figs. 7 & 8 as to coöperate with a full-stroke device comprising ratchet teeth 240 formed on the upper wall of a notch 241 formed in the lower end of a detent plate 242 which plate as shown in Fig. 5ª is the middle plate of the five plates coöperating with the totalizing key. The upper end of this plate 242 is formed with the usual notches 243 having the right angle portions 244 for holding the special transaction keys in depressed position and a similar right angled portion is formed in the notch 241 for holding the pin 190 in depressed position thereby holding the totalizing key in depressed position, and during the depressing of the totalizing key the aforesaid ratchet teeth 240 serve as a full-stroke device to compel the complete depression of the key when it has once been started; thus this plate 242 acts as an ordinary detent latch plate for the special transaction key and for the totalizing key and also acts as a full-stroke device for the totalizing key.

All of the detent plates 140 (Fig. 6), 226 (Fig. 7) and 242 (Fig. 8) are suitably spring drawn to normal position and are connected with the detent releasing means heretofore referred to in connection with the amount keys and explained in detail in the aforesaid application. The aforesaid false key 184 (see Fig. 5ª) also has projecting laterally from it an operating pin 250. This pin as shown in Fig. 6 coöperates with the beveled portion 251 of a slot 252 formed in the throwout counter detent plate 140, so that when this false key is depressed the totalizer will be thrown out of operation in just the same manner in which the special keys 32 throw the totalizer out of operation, this utilization of the throwout mechanism in connection with the depression of the false key being necessary in the operation of printing the final totals as will be later explained. The pin 250 has no effect upon the other detent plates 226 and 242 owing to the extra width of the notches 253 and 254 formed respectively in these plates as shown in Figs. 7 and 8. The pin 250 however does coöperate with the operating element 50ª shown in detail in Fig. 13, for the purpose of setting the special printing wheel. The pin 250 is so situated as to strike against the shoulder 255 formed on the lower end of the operating element 50ª, and the pin 191 (see Figs. 2 and 5ª) is arranged to strike the shoulder 256 Fig. 13 formed on the operating element 50ª adjacent to but lower than the shoulder 255. It has already been described how the special transaction keys act against this operating element 50ª to set the same differential distances for the purpose of setting the special type wheel to print the special designations, and these two shoulders 255 and 256 are so arranged relatively to the pins 250 and 191 that the pin 191 acting against the shoulder 256 moves the operating element 50ª one step farther than the lowest of the three special transaction keys whereas the pin 250 acting against the shoulder 255 moves the operating element 50ª still one step farther than the same is moved by the pin 191; consequently this enables two different designations to be printed according to whether the false key carrying the pin 250 is depressed or not. This false key, as has been described will always be depressed together with the regular totalizing key whenever the totalizing key is adjusted or rotated to its position in which the pin 183 stands in vertical position in the path of the lug 186 projecting from the false key, so that upon the depressing of the totalizing key the pin 183 will also carry inward the false key in the manner already explained, and it is upon such position of the totalizing key that the machine is prepared to print the final totals and consequently the designation is placed upon the key itself to show that this is the position of printing the final totals, this designation being if desired simply the letter "T", and the special printing wheel also being set by means of this inward movement of the false key 184 to print a corresponding designation "T" to denote that the total is the final total. Whereas if the totalizing key is adjusted to its other position in which the pin 183 assumes a horizontal position, the false key will obviously not be depressed when the totalizing key is depressed, and the pin 191 acting upon the shoulder 256 of the operating element 50ª simply sets the said element to cause the printing of a different character as already explained, to denote the printing of a sub-total, this character being for example, "S", to denote the sub-total. The difference of operation above referred to, that is, whether the machine should print the final or the sub-total, involves simply the use of this throwout totalizer mechanism which has been previously described and this operation will now be explained. It has already been explained in connection with Fig. 4 how the revolution of the lock barrel 150 turns the lever 161 and shifts to the right the shafts 166 and 167 and also the shaft 170 carrying the front line of idle pinions 171 so as to couple together the totalizer operating pinions 120 and the companion pinions 52. When this has been done the resetting of the totalizer wheels to zero in the manner already explained results in turning the totalizer operating pinions 120 to the same extent and thereby through the idle pinions 171 results in turning the pinions 52 and consequently setting all of the registering segments 50 to differential positions corresponding exactly to the amounts which have been set up upon the respective totalizer wheels in just the same manner as if the operator were to depress keys to the amount represented by what has already been registered upon the totalizer wheels, and when depressed, the registering segments 50ª would be set differentially thereby. These registering segments 50 now having been set by this resetting to zero of the counter, the machine is now operated in the ordinary manner.

By the initial revolution of the lower operating shaft 40, a disk 260 (Fig. 2) fast thereon and provided with a box cam 261 acts upon an anti-friction roller 262 formed on the lower end of a throwout bar 263 which straddles the shaft 40 and at its upper end is pivoted to the shaft 170 which carries the previously described front line of idle pinions 171. It will be seen that by the shape of this box cam that the throwout bar 263 is immediately forced upward upon the first part of the operation of the machine, and the entire front line of idle pinions 171 is carried out of engagement with their respective pairs of gears 53 and 120. Thus the front line of pinions now having been thrown out of mesh in this manner, the restoring bar 64 now comes into operation in the manner already explained, and the registering segments 50 are all restored to normal position just as they are upon the ordinary operation of the machine, and the back line of idle pinions 123 (see Figs. 1, 2 and 6) being now thrown into mesh with the companion gears 120 as is ordinarily done upon the operation of the machine the restoring of the registering segments 50 results in a corresponding degree of movement being imparted to the totalizer wheels whereby the latter are set back to the original amounts which had been accumulated thereon; but the amount printing wheels are of course as will readily be understood set to print the amounts exactly corresponding to these totals which have in effect been set up on the registering segments 50 and thus a printed record of this total will be secured upon this operation of the machine, and the total will nevertheless be retained upon the totalizer, so that this total amount can be carried forward and have the succeeding registrations added to it, this being known as a sub-total. This retaining of the accumulated amounts upon the totalizer depends upon the back line of the idle pinions being thrown into mesh with the companion gears 53 and 120 upon the initial operation of the machine. Now however when the totalizing key is adjusted to the so-called final total position in which the pin 183 assumes a vertical position to cause the depression of the false key 184 when the totalizing key is depressed, the pin 250 of the false key acts upon the bevel portion 251 (see Fig. 6) of the notch 252 of the plate 140 and moves said plate downward into the position shown in Fig. 6 in which the arms 142 has acted upon the pin 143 to break the connection between the bell crank lever 128 and the bell crank lever 131 so as to prevent the back line of pinions 123 from being thrown into engagement with the aforesaid companion gears in precisely the same manner as these various parts operate upon the ordinary process of throwing out the totalizer for the special transaction. Thus when this operation has taken place by the depression of both the totalizing key and the false key for the striking of the final total, then when the registering segments 50 are restored to normal position upon the operation of the machine, there is no connection between the totalizer operating pinions and their companion pinions 52, so that the totalizer wheels remain restored to zero after they have been reset to zero as a preliminary procedure to the striking of the final total; but of course the printing wheels are nevertheless set to differential to print this final total. That is upon the printing of the total, the final total or the sub-total is printed according to whether the throwout mechanism for the totalizer is or is not operated, in one case the totalizer being retained in its zero position to which it has been reset by the operation of the totalizing key, and in the other case the totalizer being restored to position to retain the previously accumulated amounts. Upon this operation of the machine for printing the totals the restoring bar 64 acts against the shoulder 75 of the turn to zero segment 220 (see Fig. 9) and likewise restores said segment to normal position where its pin 224 is again engaged by the nose 225 of the detent plate 226 upon the release of said plate and the release of the depressed keys which takes place at the initial operation of the machine as already referred to. This restoration of the turn to zero segment 220 of course revolves the totalizer shaft 167 in such manner as to carry the turn to zero lugs 230 back to normal position so as to permit the operation of the totalizer wheels back to their previously accumulated amounts during the operation of the machine, when the sub-total is printed; and it will be observed that the shaft 167 practically rotates with the totalizer wheels during such operation, but of course, no totalizer wheel could be turned a greater extent than nine units, in which case its turn to zero pin 231 will of course simply follow around with the turn to zero lug 230 carried by the shaft 167.

*Paper feed mechanism.*—The general construction and situation of the printing mechanism for securing the printed record both on the detail strip and check is shown in Fig. 3, but this mechanism is described in detail in said co-pending application and will only be described herein to an extent sufficient to make clear certain improvements connected with the feed mechanism and the mechanism for inking the inking rollers for the check strip.

The detail strip 280 (see Fig. 3) is mounted upon a carriage 281 which is arranged to slide laterally for the purpose of printing the amounts of the special transactions in a separate column. The strip is fed from a storage roller 282 and is wound upon a winding roller 283 being led over an impression roller 284 pivoted at the forward end of the frame 281. The frame 281 has formed upon its outer side as shown in Fig. 10 a collar 285, and by means of this collar the frame 281 is splined to a shaft 286, the spline groove 287 being shown in Fig. 10, and the purpose of the spline being to permit the lateral shifting of the frame 281 carrying the detail strip and also to permit the rocking of the frame by the rocking of the shaft 286. This rocking of the shaft 286 is produced by means of an arm 288 fast upon said shaft and carrying an antifriction roller 289 which projects into a cam groove 290 (see Fig. 10ᵇ) formed in a disk 291 fast to the upper operating shaft 38. Situated in the rear of the rock shaft 286 is the lateral shifting shaft 43 previously described which shaft is so connected with the detail strip frame 281 as to shift the detail strip to print the special transactions in a separate column as will be later described. Upon the rotation of the shaft 38, the arm 288 is rocked and thereby the shaft 286 is rocked and the forward end of the frame 281 is carried downward to bring the impression roller 284 against the type wheels 107 (see Fig. 3), and during such downward movement of the frame, the detail strip is fed by means of a feed pawl 292 shown in detail in Fig. 10ᵃ, this feed pawl being suitably pivoted to the main frame of the machine and spring-pressed into engagement with a feed ratchet 293 fast upon the winding roller 283. This feed pawl is made wide enough to engage said ratchet wheel 293 during the entire extent of shifting movement of the strip carriage. For the purpose of shifting the carriage, the aforesaid shaft 43 has formed upon its left-hand end (see Fig. 10) a disk 420 which projects into a groove 421 formed in the collar 285 which is fast to the detail strip frame 281, and thus the frame 281 may rock independently of the disk 420 upon the operation of the printer, and the shaft 43 with the disk 420 may rotate independently of the frame 281, but when the shaft 43 is shifted laterally in the manner to be presently described, the disk 420 acts upon the collar 285 to slide the entire frame 281 laterally upon its shaft 286 so that the widened detail strip will now be shifted and the relatively stationary set of type wheels will of course print in a different column upon the detail strip, the spline on the shaft 286 permitting this lateral movement of the frame 281 and at the same time making possible the rocking of the shaft for effecting the printing. This lateral shifting of the shaft 43 is effected by the operation of the machine itself upon the depression of any one of the special transaction keys 32. As shown in Fig. 2 there is pivoted upon the rock shaft 49 an upwardly extending lever 423 at the upper end of which is pivoted a horizontal link 424 which extends rearwardly to connect pivotally with a rocking frame 425 (see also Fig. 10) comprising a collar which is journaled upon the rock shaft 286, this frame carrying an upwardly extending arm 426 and a downwardly extending arm 427, which arms project into proximity with the shaft 43 and carry pins 428 and 429 respectively, the pin 428 being arranged to engage a spiral groove 430 formed in a collar 431 fast to the shaft 32, and the pin 429 being arranged to engage a spiral groove 432 formed in a collar 433 also fast to the shaft 43. In the normal position of the machine the lower pin 429 stands opposite the space 434 between the two collars 431 and 433.

By referring to Fig. 2 it will be seen that when any one of the three special transaction keys 32 is depressed, its pin 48 will strike the lever 423 and force the latter rearward, thereby forcing the link 424 rearward, and thus the frame 425 will be rocked so as to carry the pin 428 into engagement with its spiral groove 430, also rocking the lower pin 429 out from between the two collars 431 and 433. Now upon the rotation of the shaft 43 upon the operation of the machine, the spiral groove 430 acting upon the pin 428 causes the entire shaft 43 to be shifted laterally thereby shifting the detail strip frame 281 to effect the printing in a different column. To effect this shifting, the rock frame 425 is held fixed in place by means of two collars 436 fast to the shaft 286 on either side of the frame 425. If upon the next operation of the machine a special key 32 is again depressed, no shifting effect is produced upon the shaft 423, for the extent of the previous shifting has been such as to carry the space between the two collars 431 and 433 opposite the upper pin 428 and hence the pin 428 when again carried downward simply enters this space between the collars and upon the rotation of the shaft 43 no shifting effect of the carriage is produced but the carriage is locked in position because of the engagement of the pin 428 in said space between the collars. If however upon the next operation of the machine no special key is depressed but an ordinary cash transaction is recorded the lever 423 remains in normal position and therefore the lower pin 429 now rests in its spiral groove 432, the direction of which spiral is the reverse to that of the spiral 430 so that upon the revolution of the shaft 43 the spiral groove 432 acts upon the pin 429 to restore the shaft 43 and the detail strip printing frame 281 to normal position for the cash transactions, the shifting in each case preceding the printing movement. Thus it will be observed that the carriage is shifted only when it is necessary from one class of transactions to another. And the total amounts are printed in the same column with cash transactions since the total key has no effect upon the lever 423 to shift the detail strip carriage. A suitable spring retains the lever 423 in normal forward position, but since these special keys are released on the initial part of the operation of the machine, and arm 440 (see Fig. 2) is mounted upon the collar which carries the arm 169 which as previously explained has mounted in its lower end the shaft 170 as shown in Fig. 4, so that when said shaft 170 is rocked upward by means of the throw-out bar 263 in the manner previously explained, at the beginning of the operation of the machine, the arm 440 which is in effect carried by the arm 169, is rocked upward so that its curved forward end engages a pin 441 fast upon the link 424 so as to retain said link in displaced position until after the printing carriage has been shifted to proper position.

The above described construction for shifting the detail strip printing carriage is practically the same as that of the aforesaid co-pending application, with the exception of the retaining arm 440 last above described. As has been stated above the feeding of the detail strip takes place upon the downward movement of the printing carriage 281 through the medium of the feed pawl 292, but in order readily to identify the items on the strip which represent the final totals or the sub-totals, the following device is employed for giving a double feeding movement to the detail strip on the occasion of printing either kind of total. Referring to Figs. 10, 11 and 11ª, there is fast upon the side of the aforesaid feed ratchet 293 an auxiliary ratchet wheel 450 arranged to be engaged by the auxiliary feed pawl 451 pivoted at the upper end of an operating lever 452 which is pivoted upon the shaft 286 and has a downwardly extending arm 453 carrying an antifriction roller 454 which plays in a cam groove 455 formed in a disk 456 fast upon the upper operating shaft 38 so that when said shaft is revolved the operating lever 452 will be carried rearward carrying with it the feed pawl 451, but said feed pawl is normally held out of engagement with its ratchet wheel by reason of a pin 457 which is fast on the side of the pawl and normally rests upon a semi-circular disk 458 mounted upon a stub shaft 459 extending from the side frame of the machine, said disk having upon its forward and downward edge a segment rack 460 which meshes with a pinion 461 (Figs. 4, 10 and 11) fast upon an extension 462 of the previously described totalizer shaft 167, this extension being connected to the shaft 167 by a mortise joint 463 shown in Fig. 10 so as to permit the lateral shifting of the shaft 167 while insuring the rotation of the pinion 461 with said shaft. Thus when the totalizer wheels are reset to zero by the rotation of the shaft 167 it will be seen that the segment 460 and disk 458 are rotated into the position shown in Fig. 11ª so that the disk 458 is withdrawn from position of support for the pin 457, and the pawl 451 may now drop into engagement with its ratchet 450 and thus upon the subsequent operation of the machine for printing the total in the manner already set forth, the operation of the arm 452 will cause the auxiliary feed pawl 451 to give the ratchet wheel 450 a spacing movement, this spacing movement being cumulative as regards the ordinary feed of the paper by means of the main feed pawl 292, and taking place at the first part of the operation of the machine prior to the time of the main feed by the pawl 292. The pin 457 is extended laterally far enough so that notwithstanding the shifting of the detail strip carriage 281 the pin always rests upon the periphery of the disk 458 until said disk is rotated upon the operation of resetting the totalizer to zero in the manner above described. A spring 462 pulls the pawl 451 downward to engage its ratchet 450.

*Inking mechanism.*—A check strip 470 (see Fig. 3) passes through a chute 471 and is then led between impression rollers and then under the lower side of the type wheel 107, the impression rollers printing any desired advertising matter upon the check and the type wheels printing the items of the individual transaction. This printing mechanism is described in detail in the aforesaid pending application and the only improvement in the present application concerns the inking of the impression roller 472. This impression roller is formed with mutilated flanges 473 one on each side of the roller, which flanges engages disks 474 formed on the sides of the inking roller 475, the shaft of this inking roller being mounted in a slotted bearing 476. A suitable spring carries the ink roller 475 upward to cause the same to engage the printing surface of the impression roller 472, but the shape of the mutilated flanges 473 is such that the ink roller is permitted to move far enough upward to engage the printing surface only upon those points in the rotation of the impression roller 472 at which the flanges 473 are cut away and consequently the inking takes place only at these points and in the intermediate points where the flanges 473 are raised above the surface of the type, the ink roller is forced away from the impression roller and there is no inking of those parts of the roller which do not carry type and consequently any smearing effect on the check due to the inking of such blank portions is obviated. The impression roller 472 derives its rotation by means of a gear 477 fast upon the lower operating shaft 40, which gear 477 meshes with another gear 478 fast upon the side of the impression roller 472, and the gear 478 meshes with a gear 479 to transmit movement to the upper impression roller, the check strip being fed between these upper and lower impression rollers.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

Having thus described the invention what I claim as new and desire to secure by Letters Patent is:

1. In an accounting machine, the combination with a series of accumulating devices, of means for securing a record of the amounts accumulated on said devices; and adjustable means for predetermining whether the accumulating devices shall be finally reset to zero or whether the accumulation shall be retained, said adjustable means comprising a key which is adjustable to two different positions corresponding to said two predetermined results and is then depressible to set the necessary devices to effect such result.

2. In an accounting machine, the combination with a series of accumulating devices, of means for printing a final total or a sub-total of the amounts accumulated on said devices; and a totalizing key for predetermining whether a final total or sub-total shall be printed, said key being constructed to be adjusted into two different positions prior to depression, to effect such predetermining, with connecting means actuated upon the depression of the key to coöperate with the devices for controlling the said printing of totals.

3. In an accounting machine, the combination with accumulating devices, and means for printing totals therefrom, of an operable printing controlling element having provisions permitting a plurality of adjustable positions of said element, prior to its depression, the depression of said controlling element serving to cause printing of totals or sub-totals according to the preliminary adjustment of said element.

4. In an accounting machine, the combination with a totalizer, and zero setting means for said totalizer normally out of operative relation therewith, of banks of keys controlling said totalizer, plates constructed to lock all said banks of keys, a key controlled device constructed to move said locking plates to positions locking said banks of keys, and connections from said key controlled device for establishing a coöperative relation between said totalizer and its zero setting means.

5. In an accounting machine, the combination with a series of accumulating devices, of means for recording the final totals and the sub-totals of the amounts accumulated; of an adjustable device for controlling the recording of one of said kinds of totals; and a second adjustable device having provisions for engaging the first adjustable device and adjustable to control the printing of either a final total or a sub-total according to its adjustment to engage with or be disengaged from said first mentioned adjustable device.

6. In an accounting machine, the combination with a series of accumulating devices, of means for recording final totals or sub-totals of the amounts accumulated on said devices; of a false key for controlling parts to effect the printing of one kind of total; and a totalizing key having provisions for engaging said false key but being adjustable to be disengaged from the same, the operation of said totalizing key controlling the recording of either kind of total according to its adjustment to engage with or be disengaged from said false key.

7. In an accounting machine, the combination with a series of accumulating devices, of a series of amount keys for controlling the amounts added upon said devices; a series of special transaction keys coöperating with mechanism for throwing out of operation said accumulating devices when the special keys are operated in conjunction with amount keys; means for printing the totals of amounts added on said accumulating devices; and a totalizing manipulative device for controlling the printing of said totals, said manipulative device coöperating with said throw-out mechanism.

8. In an accounting machine, the combination with a series of accumulating devices, of means for printing final totals and sub-totals of the amounts accumulated thereon; a series of amount keys for controlling the amounts accumulated on said devices; a series of special keys coöperating with mechanism for throwing the accumulating devices out of operation when said special keys are operated in conjunction with amount keys; and a totalizing key for controlling the printing of said final totals and said sub-totals, said key having provisions for coöperating with said throw-out mechanism when final totals are to be printed.

9. In an accounting machine, the combination with a series of depressible keys, of a detent plate therefor having provisions for latching said keys when they are fully depressed and also having provisions to compel the complete full stroke of one of said keys after initial depression thereof.

10. In an accounting machine, the combination with a series of accumulating devices, and a series of amount keys for controlling the amounts added upon said devices; of means for printing the total amounts added upon said devices; a totalizing key for controlling said printing; means for locking said totalizing key; and a manipulative device adjustable to unlock said total key locking means and lock said amount keys.

11. In an accounting machine, the combination with a series of accumulating devices, and a series of amount keys for controlling the amounts added thereon, of a series of special transaction keys; a series of clerk's keys; means for printing totals of the amounts added upon said accumulating devices; a totalizing key for controlling such printing; means for locking said totalizing key; and a manipulative device adjustable to unlock said total key locking means and lock both said amount keys and said special keys, but having provisions permitting said clerk's keys to remain always unlocked.

12. In an accounting machine, the combination with a main operating mechanism of accounting mechanism operable thereby, of a series of keys arranged in groups, a series of locking plates for said groups, and a manipulative device and connections for adjusting all of said locking plates to lock all said keys independently of the actuation of said main operating mechanism.

13. In an accounting machine, a key having a diagonal locking notch extending across the angle formed by two adjacent surfaces of the body portion of said key.

14. In an accounting machine, the combination with a series of accumulating devices, of means for printing totals of the amounts accumulated thereon; devices for preparing for the printing of totals; a totalizing key for controlling the printing of said totals; and a manipulative device adjustable to unlock said total key and simultaneously set said preparing devices.

15. In an accounting machine, the combination with a series of accumulating devices, of means for printing totals of the amounts accumulated thereon; devices for preparing for the printing of totals; a total key for controlling the printing of such totals; devices for resetting the accumulating devices to zero; means for transmitting the movement of the accumulating devices to the printing devices; and a manipulative device adjustable to unlock said total key, set said preparing devices for permitting the resetting of accumulating devices to zero, and also for controlling the transmission of the movement of the accumulating devices to the printing devices.

16. In an accounting machine, the combination with a series of accumulating devices, of means for printing final totals and sub-totals of the amounts accumulated thereon; a totalizing key and mechanism controlled thereby for predetermining whether a final or sub-total shall be printed; devices for resetting said accumulating devices to zero; devices for transmitting movement of the accumulating devices to the printing mechanism; and a manipulative device adjustable to unlock said total key, set devices for permitting the resetting of the accumulating devices to zero, and for also permitting transmission of the movement of the accumulating devices to the printing mechanism upon such resetting to zero.

17. In an accounting machine, the combination with accumulating devices, of means for printing totals of amounts accumulated thereon, a totalizing key for controlling said total printing, mechanism operated directly by said key for resetting said accumulating devices, and connecting means manually operated for causing resetting of said accumulating devices to determine the printing by said total printing means.

18. In an accounting machine, the combination with accumulating devices, of means for printing totals of the accumulated amounts, a total key for controlling the printing of totals, mechanism actuated by said key for positively resetting said accumulating devices to zero, devices for determining the adjustment of said total printing means, and manually actuated means for connecting said accumulating devices to said determining devices, whereby resetting of said accumulatng devices positions the determining devices.

19. In an accounting machine, the combination with accumulating devices, of means for printing totals of the amounts entered thereon, a total key controlling the printing of totals, a shaft carrying said accumulating devices, a segment operated by said total key, connections between said segment and shaft for resetting said accumulating devices by movement of said segment, and manually actuated connecting means whereby resetting said accumulating devices determines the printing by said total printing means.

20. In an accounting machine, the combination with a series of accumulating devices, of means for printing a total of the amounts accumulated thereon; a total key for controlling the printing of such totals; an operating member operated by said total key for resetting the accumulating devices to zero; and a detent plate coöperating with said operating device and with said total key, with provisions whereby said detent plate is operated by said total key to release said operating device prior to said resetting movement.

21. In an accounting machine, the combination with a series of accumulating devices, of means for printing totals of amounts accumulated thereon; a total key for controlling the printing of such totals; an operating mechanism for the machine; a zero setting shaft carrying said accumulating devices; an operating device controlled by said total key for resetting the accumulating devices to zero by the rotation of said shaft; and means connected with said operating mechanism for restoring said shaft to normal position to permit subsequent movement of said accumulating devices.

22. In an accounting machine, the combination with accumulating devices, and an actuating mechanism therefor, of "throwout" mechanism for preventing operation of said accumulating devices by said actuating mechanism, total printing devices, adjustable means for resetting said accumulating devices to zero, connections whereby the amount accumulated may be set up on the printing devices through the resetting of said accumulating devices, and connections whereby said adjustable means when in one position actuates said "throwout" mechanism.

23. In an accounting machine, the combination with totalizing mechanism, and means for adding amounts thereto, of printing devices, mechanism for connecting said totalizing mechanism to said printing devices whereby totals and sub-totals may be printed, a totalizing key constructed to be both rotated and depressed, and devices operated by said key for controlling said connecting mechanism variably depending on whether the key has been rotated before its depression or not.

24. In an accounting machine, the combination with operating mechanism printing mechanism, a regular paper feeding mechanism connected to said operating mechanism and operated at each actuation thereof, an auxiliary feeding mechanism also connected to said operating mechanism, and moved at each actuation thereof, and a manipulative device for rendering said auxiliary feeding mechanism effective or ineffective as desired.

25. In an accounting machine, the combination with a series of keys, and type-carriers controlled thereby, of means for printing from said type-carriers; a main paper feeding device; an auxiliary paper feeding device; and a common operating mechanism for operating said main feed and said auxiliary feed successively.

26. In an accounting machine, the combination with keys and type carriers controlled thereby, of means for printing from said type carriers, an operating mechanism for said printing means, regular and auxiliary paper feeding mechanism each connected permanently to said operating mechanism and actuated at each operation thereof, and manipulative means for rendering said auxiliary feeding mechanism effective or ineffective as desired.

27. In an accounting machine, the combination with accumulating devices, of means for printing totals of amounts accumulated thereon, a total key controlling the printing of such totals, regular and auxiliary paper feeding mechanisms, an operating mechanism for actuating said paper feeding mechanism and means controlled by said total key for rendering said auxiliary feeding mechanism effective.

28. In an accounting machine, the combination with a series of accumulating devices, of a series of amount keys controlling amounts added upon said accumulating devices; type carriers controlled by said amount keys; means for printing totals of the amounts accumulated on said accumulating devices; a total key controlling the printing of such totals; a paper feeding mechanism coöperating with the printing means, said feeding mechanism operating to give normally a uniform extent of feed in connection with the printing of the successive individual amounts; and means controlled by the total key for causing the feeding mechanism to give the paper an excessive feed upon the printing of such totals.

29. In an accounting machine, the combination with a series of accumulating devices, means for printing totals of amounts accumulated thereon; a turn to zero shaft carrying said accumulating devices; a paper feeding mechanism coöperating with said printing mechanism; and means controlled by said turn to zero shaft for causing the feed mechanism to give the paper an excessive feed.

30. In an accounting machine, the combination with a series of accumulating devices, of means for printing totals of the amounts accumulated thereon; a turn to zero shaft carrying said accumulating devices; means for shifting said shaft longitudinally to permit the resetting to zero of the accumulating devices; a paper feeding means coöperating with said printing means; and means controlled by the turn to zero shaft for causing the feeding mechanism to give the paper an excessive feed.

31. In an accounting machine, the combination with a printing mechanism, of a shifting carriage carrying paper for receiving the printing impression; a series of special keys; a device set by said keys for predetermining the movement of said carriage; an operating mechanism for shifting said carriage; and means controlled by the operating mechanism for holding said key controlled setting device in set position independently of the special keys after the operation of the machine has begun.

32. In a calculating machine, the combination of a main operating device with actuating devices and printing devices including paper rolls, means connected with said main operating device for moving said paper rolls a predetermined distance, and means also connected with said main operating device for moving said paper rolls automatically an additional predetermined distance for the purpose specified.

33. In an accounting machine, the combination with printing mechanism, an operating mechanism, and paper feeding means permanently connected to said operating mechanism, of a special key and connections controlled thereby normally holding said feeding means in ineffective condition, but constructed to allow effective movement of same when the key is operated.

34. In an accounting machine, the combination with type carriers and means controlling same, of means for taking impressions from said carriers, an operating mechanism, paper feeding means connected to said mechanism, an additional paper feeding means permanently connected to said mechanism, and a special key controlling the effectiveness of said additional means.

35. In an accounting machine, the combination with a series of keys, and type carriers controlled thereby, means for printing from said carriers, and line spacing means constructed to be operated at each actuation of the machine; of a manipulative device and connections for withdrawing said spacing means to render same completely ineffective but arranged to permit effective operation of the spacing means when said device is actuated.

36. In an accounting machine, the combination with printing mechanism, means for taking impressions from same, an operating mechanism, and paper feeding means permanently connected to and constructed to be actuated by said operating mechanism; of a manipulative device and connections from said device to said feeding means constructed to render said means normally ineffective, but when said device is operated, to permit effective actuation of said feeding means.

37. In an accounting mechanism, the combination with totalizing mechanism and printing devices, of a key having a portion movable in two directions, means under control of said key for connecting said totalizing mechanism to said printing devices for printing of totals and sub-totals, said means being operated by movement of said key in one direction, and devices actuated by the movement of said key in the other of its directions for variably determining whether a total or a sub-total will be printed.

38. In an accounting machine, a depressible key formed in two sections, one of which is mounted within the other and rotatable independently thereof to effect the performance of different functions upon the depression of the entire key according to the preliminary adjustment of said sections relatively to each other.

39. In an accounting machine, the combination with a depressible key formed in two sections, one of which is movable independently of the other to effect the performance of different functions upon the depression of the entire key according to the preliminary adjustment of said sections relatively to each other, of means for holding the movable section in its adjusted position during the operation of the entire key.

40. In an accounting machine, the combination with a depressible key formed in two sections, one of which is movable independently of the other to effect the performance of different functions upon the depression of the entire key according to the preliminary adjustment of said sections relatively to each other, of means for holding the movable section in its adjusted position during the operation of the entire key, and devices compelling full strokes of said key.

41. In an accounting machine, the combination with a series of accumulating devices, of a series of amount keys for controlling the amounts added upon said devices, a special key, means controlled thereby for preventing the operation of said accumulating devices when the special key is operated in conjunction with amount keys, means for printing the totals of amounts added on said accumulating devices, and a totalizing manipulative device for controlling the means for printing said totals, said manipulative device coöperating with the means for preventing the operation of the accumulating devices.

42. In an accounting machine, the combination with a series of accumulating devices, of a series of amount keys for controlling the amounts added upon said devices, a special key, means controlled thereby for preventing the operation of said accumulating devices when the special key is operated in conjunction with amount keys, means for printing final totals and sub-totals of the amounts added on the accumulating devices, and means for predetermining the printing of either a final total or a subtotal, the said predetermining means coöperating with the means for preventing the operation of the accumulating devices when a final total is to be printed.

43. In an accounting machine, the combination with a series of accumulating devices, of actuators therefor, a series of amount keys for determining the extents of movement of the actuators, means for connecting the accumulating devices and actuators after the latter have been moved their determined extents, operating mechanism for returning the actuators to normal position after they and the accumulating devices have been connected and thereby actuating said accumulating devices, a special key, means controlled thereby for preventing the connection of the actuators and accumulating devices when the special key is operated in conjunction with the amount keys, means for printing the totals of amounts added on said accumulating devices, and a total manipulative device for controlling said total printing means, said manipulative device controlling the effective operation of the means for connecting the accumulating devices and the actuators.

44. In an accounting machine, the combination with a series of accumulating devices, of actuators therefor, a series of amount keys for determining the extents of movement of the actuators, means for connecting the accumulating devices and actuators after the latter have been moved their determined extents, operating mechanism for returning the actuators to normal position after they and the accumulating devices have been connected and thereby actuating said accumulating devices, a special key, means controlled thereby for preventing the connection of the actuators and accumulating devices when the special key is operated in conjunction with the amount keys, typecarriers for printing totals under the control of the actuators, and a total manipulative device for controlling the printing of said totals, the said manipulative device having connections preventing the operation of the connecting means for the accumulating devices and the actuators so that the latter will not affect the accumulating devices when said actuators are returned to normal position by the operating mechanism.

45. In an accounting machine, the combination with a series of accumulating devices, of actuators therefor, a series of amount keys for determining the extents of movement of the actuators, means for connecting the accumulating devices and actuators after the latter have been moved the determined extents, operating mechanism for returning the actuators to normal position after they and the accumulating devices have been connected and thereby actuating said accumulating devices, a special key, means controlled thereby for preventing the connection of the actuators and accumulating devices when the special key is operating in conjunction with the amount keys, type carriers controlled by the actuators for printing the totals of amounts added on the accumulating devices, additional means for connecting the accumulating devices and actuators when it is desired to print a total, a manually operated device controlling the additional connecting means, and a totalizing manipulative device controlled by the manually operated device for controlling the printing of said totals, the said manipulative device actuating the first mentioned connecting means to prevent its effective operation.

46. In an accounting machine, the combination with a series of accumulating devices, of actuators therefor, typecarriers controlled by said actuators for printing items and the totals thereof, means for connecting the accumulating devices and actuators when the machine is operated to print items, additional means for connecting the accumulating devices and actuators when it is desired to print a total, and a manipulative device controlling the printing of totals, the said manipulative device actuating the first mentioned connecting means to prevent its effective operation.

47. In an accounting machine, the combination with a series of accumulating devices, of actuators therefor, type carriers controlled by said actuators for printing items and the totals thereof, pinions and means for moving the same to connect the accumulating devices and actuators when the machine is operated to print items, additional pinions normally out of operative position for connecting the accumulating devices and actuators when it is desired to print a total, manually operated means for moving the additional pinions to connect the accumulating devices and actuators, and a total manipulative device controlling the printing of the totals and preventing the operation of the first mentioned pinions.

48. In an accounting machine, the combination with a series of accumulating devices, of actuators therefor, a series of amount keys for controlling the movement of the actuators, typecarriers controlled by said actuators for printing items and the totals thereof, means for connecting the accumulating devices and actuators when the machine is operated to print items, a normally locked manipulative device controlling the printing of the totals, additional means normally out of operative position, for connecting the accumulating devices and actuators when it is desired to print the total, manually operated means having connections for moving the additional means to connect the accumulating devices and actuators, for unlocking the total manipulative device, and for locking the amount keys, and means actuated upon the operation of the total manipulative device for disabling the first mentioned connecting means for the accumulating devices and actuators.

49. In an accounting machine, the combination with a series of accumulating devices, and a set of actuators therefor, of a series of amount keys for controlling the movement of the actuators, typecarriers controlled by said actuators for printing items and the totals thereof, means for connecting the accumulating devices and actuators when the machine is operated to print items, additional means normally out of operative position, for connecting the accumulating devices and actuators when it is desired to print totals, a normally locked manipulative device controlling the printing of the totals, manually operated means having connections for moving the additional means to connect the accumulating devices and actuators, for unlocking the total manipulative device, and for locking the amount keys, and means actuated upon the operation of the total manipulative device for resetting the accumulating devices, and through the additional connecting means moving the actuators proportionately.

50. In an accounting machine, the combination with a series of accumulating devices, and a set of actuators therefor, of a series of amount keys for controlling the movement of the actuators, typecarriers controlled by said actuators for printing items and the totals thereof, means for connecting the accumulating devices and actuators when the machine is operated to print items, additional means normally out of operative position, for connecting the accumulating devices and actuators when it is desired to print totals, a normally locked manipulative device controlling the printing of the totals, manually operated means having connections for moving the additional means to connect the accumulating devices and actuators, for unlocking the total manipulative device, and for locking the amount keys, means for resetting the accumulating devices and through the additional connecting means moving the actuators proportionately, and a latching device for said resetting means which is released upon the operation of the total manipulative device.

51. In an accounting machine, the combination of accounting mechanism; operating means therefor; a series of keys for controlling the operating mechanism; locking plates for the keys, and a manipulative device and connections for adjusting all the locking plates to lock all the keys independently of the actuation of the operating mechanism.

52. In an accounting machine, the combination of a totalizer; operating means therefor, a plurality of keys for controlling the operating mechanism and its effect upon the totalizer; a plurality of locking means for the keys; and a manipulative device and connections for controlling all of the locking means to lock all of said keys independently of the actuation of the operating mechanism.

53. In an accounting machine, the combination of accounting mechanism; a series of keys arranged in groups for controlling the operation of the accounting mechanism in certain accounting operations; a series of locking plates for said groups, and a manipulative device for controlling the operations of the machine for other accounting operations and having connections for adjusting all of said locking plates to lock all of said keys when said other accounting operations are being carried out.

54. In an accounting machine, the combination with a main operating mechanism for the accounting machine, of a series of keys arranged in groups, a series of locking plates for said groups; and a single manipulative device and connections for adjusting all of said locking plates to lock all of said keys upon an operation of the machine not controlled by the keys.

In testimony whereof I affix my signature in the presence of two witnesses.

THOMAS CARROLL.

Witnesses:
WM. O. HENDERSON,
G. C. EDGETEN.

---

Corrections in Letters Patent No. 1,106,490.

It is hereby certified that in Letters Patent No. 1,106,490, granted August 11, 1914, upon the application of Thomas Carroll, of Dayton, Ohio, for an improvement in "Cash-Registers," errors appear in the printed specification requiring correction as follows: Page 2, line 78, after the word "is" insert the words and reference-numeral *still another single special key 33 which is the total key whose specific construction will;* page 4, strike out lines 4–29; page 8, line 97, and page 9, lines 17 and 120, for the word "counter" read *totalizer;* and that the said Letters Patent should be read with these corrections therein that the same may conform to the record of the case in the Patent Office.

Signed and sealed this 20th day of October, A. D., 1914.

[SEAL.]

J. T. NEWTON,
*Acting Commissioner of Patents.*